Dec. 6, 1960  F. L. FISCHER ET AL  2,963,285
FRICTIONLESS ACCELEROMETER
Filed March 9, 1956
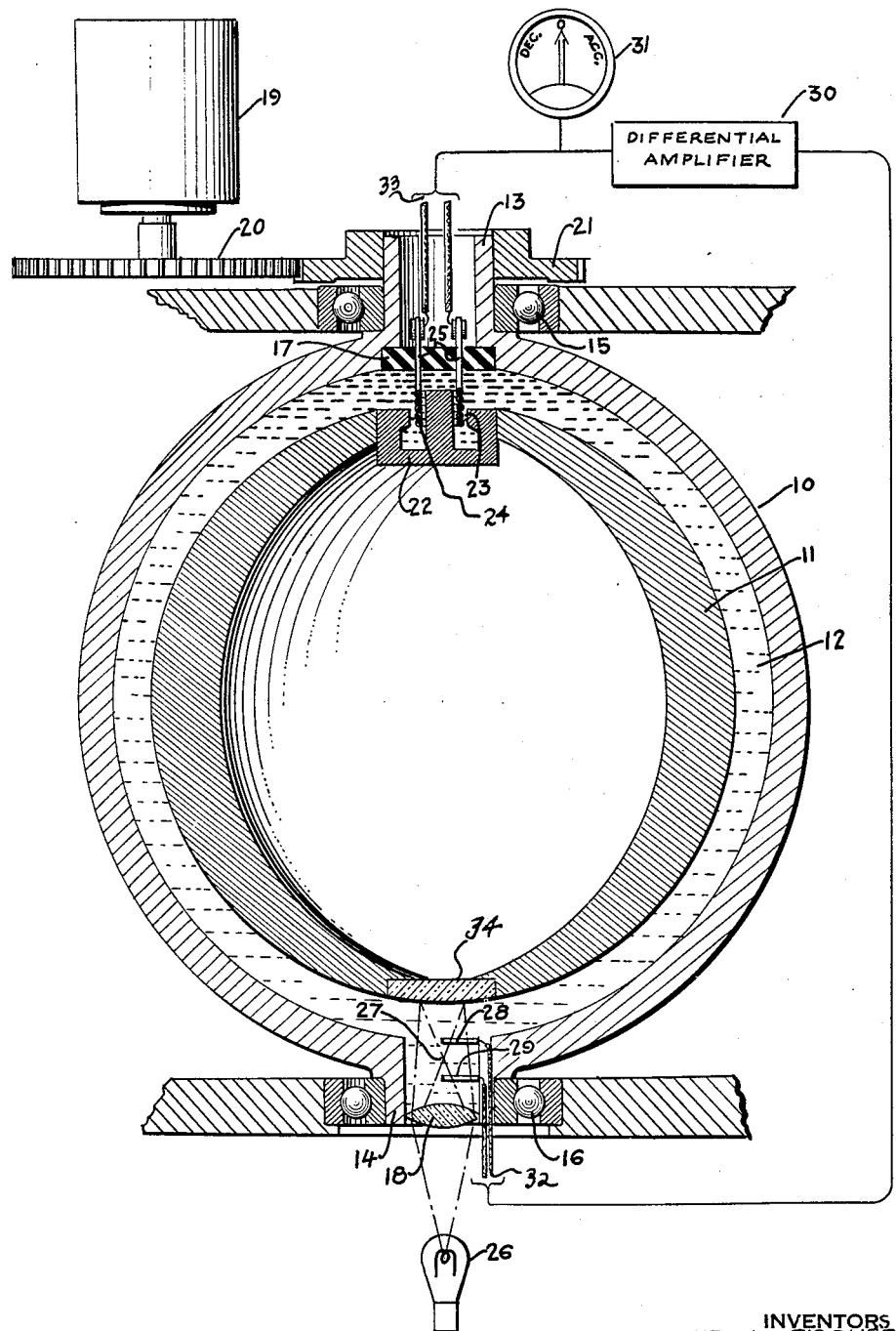
INVENTORS
FRANZ L. FISCHER
ERNST F. WERNDL
BY
Kenyon & Kenyon
ATTORNEYS

United States Patent Office 2,963,285
Patented Dec. 6, 1960

2,963,285

FRICTIONLESS ACCELEROMETER

Franz L. Fischer, Jackson Heights, and Ernst F. Werndl, New York, N.Y., assignors to Bulova Research and Development Laboratories, Inc., Woodside, N.Y., a corporation of New York Filed Mar. 9, 1956, Ser. No. 570,527

3 Claims. (Cl. 73—516)

The present invention relates generally to linear accelerometers in which the acceleration to be measured is given to an otherwise freely moving mass through an electromagnet, the force of which can be measured to afford an indication of the acceleration.

The rate of change in the velocity of a moving body is called acceleration. Conventional accelerometers are constituted by a weighted cantilever spring subjected to accelerating forces to produce a deflection in accordance with the force. Due to friction losses, such devices are lacking in precision.

Accordingly, it is the principal object of the invention to provide a linear accelerometer of high precision which is substantially frictionless.

More specifically, it is an object of the invention to provide an accelerometer characterized by the fact that an electromagnetic force required to give the acceleration is the only force to which the accelerometer mass is subjected. The mass is freely supported and can move without restraint from any mechanical friction, whereby the force measured is the actual accelerating force.

Also an object of the invention is to provide an accelerometer instrument which is efficient, reliable and may be manufactured at relatively low cost.

For a better understanding of the invention, as well as other objects and further features thereof, reference is had to the following drawing whose single figure is a section in the axial plane of a preferred embodiment of an accelerometer in accordance with the invention.

Referring now to the drawing, the accelerometer according to the invention comprises a spherical outer vessel 10, surrounding a spherical inner vessel 11 and spaced therefrom. A liquid 12 fills the spacing between the inner and outer vessels. Inner vessel is hollowed out to have a mean density less than the density of the liquid whereby the inner vessel 11 floats within the outer vessel 10. In practice the liquid may be silicon oil or any other liquid of suitable density.

Outer vessel 10 may be of plastic or metallic construction and is provided at its polar positions with hollow trunnions 13 and 14 journalled in ball-bearings 15 and 16, mounted in stationary supports. The passage through the top trunnion 15 is enclosed by an insulating plate 17 and the passage through the bottom trunnion 14 is enclosed by an optical lens 18, whereby the outer vessel is hermetically sealed.

Outer vessel 10 is rotated about its polar axis at a high speed by means of a motor 19 having a gear 20 secured to its armature shaft, gear 20 intermeshing with a gear 21 keyed to trunnion 13. When in operation, the outer and inner vessels and the separating liquid turn together as a unit at the same speed. The centrifugal action of the liquid then has a centering effect on inner vessel 11 from side to side, but not axially. The wall thickness of inner vessel is greatest at its equator. Thus most of its mass is concentrated near the equator, thereby stabilizing the spin of the inner vessel.

Provision is made to center the inner sphere 11 axially within the outer sphere 10. To this end, a permanent magnet 22 is secured to the upper pole of sphere 11. The magnet is constituted by a cylindrical cup having a pole mounted centrally therein to define an annular air gap 23 therebetween, the pole and cup being of opposing polarity. A helical coil 24 of insulated copper wire is rigidly supported on two stiff rods 25 carried by insulation plate 17 on the outer sphere 10, the coil being disposed in the air gap 23 concentrically about the center pole of the magnet.

If a direct current is sent through coil 24, the resultant magnetic field acting upon the permanent magnet 22 will urge inner vessel 11 in one axial direction or in the reverse direction, the particular direction depending on the polarity of the current. The magnitude of the current required to counteract the effect of acceleration and to centralize the inner sphere will be a measure of the acceleration to which the instrument is subjected. The polarity of the current to effect centering is determined by whether the instrument is acted upon by an accelerating or decelerating influence. Thus, by metering the polarity and magnitude of the applied current, an indication is had of acceleration or deceleration.

A feedback network is provided automatically to adjust the coil current so as to maintain the inner sphere at its zero position whereby the reading of an ammeter in the circuit, when properly calibrated, affords a continuous indication of acceleration and deceleration. To this end, the inner vessel 11 carries at its lowermost pole a convex mirror 34 having a curvature corresponding to that of the outer surface of the inner sphere. Light from a lamp 26 coaxially aligned with the trunnion 14 passes through lens 18 at the end of the trunnion 14 and is reflected by mirror 34 such that if the inner vessel 11 is at its zero position, the light is brought to focus at an axial point 27 within trunnion 14.

Equidistant from point 27 above and below said point within trunnion 14 are two photocells 28 and 29 projecting laterally from the inner wall of the trunnion and extending to the axial line. The sensitive areas of the photocells face the mirror 34, so that when the inner vessel 11 is in its mid position, cells 28 and 29 intercept equal portions of the beam reflected by mirror 34. But on displacement of the inner vessel, the illumination of the two cells becomes unequal, the degree of inequality being determined by the displacement of the inner sphere from the midpoint.

The currents from photocells 28 and 29 are fed to the input of a differential, direct-current amplifier whose output is the algebraic difference of the inputs, so that when the photocell currents are equal, no output is yielded, but when an inequality exists, the polarity and magnitude of the output depends on the extent and direction of the inequality.

The output of amplifier 30 is applied to control coil 24 through rods 25 to centralize the inner vessel and thereby equalize the illumination of the photocells. A null indicating ammeter 31 located in the output of the amplifier, when properly calibrated, will indicate on one side of the null point, the extent of acceleration, and on the other side the extent of deceleration.

Since the control coil 24 and the photocells 28 and 29 both rotate with the outer sphere 10, connection is made to them by slip rings and brushes as at 32 and 33. To prevent ambient temperature changes from affecting the accuracy of the instrument, the spheres are preferably housed in a temperature-controlled chamber.

For quick starting of the instrument, a clamp may be provided inside the inner sphere to hold the inner sphere and force it to turn with it. This clamp may be arranged to open automatically by centrifugal force when a predetermined rate of spin is reached. Alternatively, this clamping action may be obtained by initially applying a strong current to coil 24 in a direction, causing the sphere to engage plate 17 and to rotate therewith. After the spheres have attained their full rotational speed, coil 24 is then switched over to amplifier 30. It is to be noted that the current yielded by the photocells 28 and 29 is independent of the speed of rotation of the inner sphere, so that a uniform speed is not a prerequisite to precision.

The accelerometer according to the invention is intended primarily for use on a stabilized platform where angular displacements are practically non-existent.

While an optical detector has been disclosed to determine the departure of the inner sphere from its axial midpoint, it will be readily appreciated that other means may be used for this purpose, such as electrodynamic or electrostatic devices. Moreover, the inner vessel need not be spherical in form and other floating masses of symmetrical form such as a hollow cylinder with a saturn ring at its equator may be used to provide the desired stability.

While there has been shown what is considered to be a preferred embodiment of the invention, it will be manifest that many changes and modifications may be made therein without departing from the essential spirit of the invention. For instance, the magnet arrangement 22, 23 with coil 24 might be located anywhere on the rotational axis, even at the center of the ball. It is intended, therefore, in the annexed claims to cover all such changes and modifications as fall within the true scope of the invention.

What is claimed is:

1. A frictionless accelerometer comprising a spherical outer vessel, a spherical inner vessel disposed within said outer vessel and spaced therefrom, a liquid filling said space and having a density rendering said inner vessel buoyant, first and second hollow trunnions projecting from opposing poles of said outer sphere to support said outer sphere for rotary motion about an axis, means to apply torque to one of said trunnions to effect rotation of said outer vessel and thereby set said liquid and said inner vessel into spinning motion, said inner vessel being displaced axially from the center to an extent and direction depending on an axially directed acceleration to which said inner vessel is subjected, and means automatically to restore said inner vessel to said center and to provide an indication of said acceleration, said means including a mirror mounted on said inner vessel at one pole thereof and having a curvature corresponding to that of said inner sphere, optical means to direct a light ray through the other of said hollow trunnions onto said mirror, whereby said mirror reflects said rays and causes them to converge at a focal point whose axial position within said trunnion depends on the axial position of said inner vessel, light sensitive photoelectric detector means responsive to said reflected rays to provide a signal whose magnitude and phase depends on the extent and direction to which said inner vessel is displaced axially from center, a permanent magnet secured to said inner sphere at the other pole thereof, a coil secured to said outer sphere adjacent said magnet, means to apply said signal to said coil to provide a magnetic force acting upon said permanent magnet causing said sphere to assume its center position, and means to measure said signal to determine said acceleration.

2. A frictionless accelerometer comprising a spherical outer vessel, a spherical inner vessel disposed within said outer vessel and spaced therefrom, the mass of said inner vessel being concentrated equatorially, a liquid filling said space and having a density rendering said inner vessel buoyant, first and second hollow trunnions projecting from opposing poles of said outer sphere to support said outer sphere for rotary motion, means to apply torque to one of said trunnions to effect rotation of said outer vessel and thereby set said liquid and said inner vessel into spinning motion and causing said inner vessel to center transversely with respect to the axis of rotation, said inner vessel being displaced axially from the center to an extent and direction depending on an axially directed acceleration to which said inner vessel is subjected, and means automatically to restore said inner vessel to said center and to provide an indication of said acceleration, said means including a mirror mounted on said inner vessel at one pole thereof and having a curvature corresponding to that of said inner sphere, optical means to direct a light ray through the other of said hollow trunnions onto said mirror, whereby said mirror reflects said rays and causing them to converge at a focal point whose axial position within said trunnion depends on the axial position of said inner vessel, light sensitive photoelectric detector means responsive to said reflected rays to provide a signal whose magnitude and phase depends on the extent and direction to which said inner vessel is displaced axially from center, a permanent magnet secured to said inner sphere at the other pole thereof, a coil secured to said outer sphere adjacent said magnet, means to apply said signal to said coil to provide a magnetic force acting upon said permanent magnet causing said sphere to assume its center position, and means to measure said signal to determine said acceleration.

3. An accelerometer, as set forth in claim 1, wherein said light sensitive detector means includes a pair of photocells disposed adjacent to said other trunnion on either side of said focal point to receive relative illumination from said reflected rays depending on the axial position of the inner vessel.

References Cited in the file of this patent

UNITED STATES PATENTS

| | | |
|---|---|---|
| 2,591,921 | Cosgriff et al. | Apr. 8, 1952 |
| 2,618,159 | Johnson et al. | Nov. 18, 1952 |
| 2,691,306 | Beams et al. | Oct. 12, 1954 |
| 2,695,165 | Hansen | Nov. 23, 1954 |
| 2,840,366 | Wing | June 24, 1958 |